US012430849B2

(12) United States Patent
Xue et al.

(10) Patent No.: US 12,430,849 B2
(45) Date of Patent: Sep. 30, 2025

(54) SYSTEMS AND METHODS FOR MULTIMODAL PRETRAINING FOR THREE-DIMENSIONAL UNDERSTANDING MODELS

(71) Applicant: Salesforce, Inc., San Francisco, CA (US)

(72) Inventors: Le Xue, Mountain View, CA (US); Ning Yu, Palo Alto, CA (US); Shu Zhang, Fremont, CA (US); Junnan Li, Singapore (SG); Caiming Xiong, Menlo Park, CA (US); Silvio Savarese, Palo Alto, CA (US); Juan Carlos Niebles Duque, Mountain View, CA (US); Ran Xu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 110 days.

(21) Appl. No.: 18/493,035

(22) Filed: Oct. 24, 2023

(65) Prior Publication Data
US 2024/0312128 A1    Sep. 19, 2024

Related U.S. Application Data

(63) Continuation-in-part of application No. 18/182,939, filed on Mar. 13, 2023.
(Continued)

(51) Int. Cl.
*G06T 17/00* (2006.01)
*G06F 40/40* (2020.01)

(52) U.S. Cl.
CPC ............. *G06T 17/00* (2013.01); *G06F 40/40* (2020.01)

(58) Field of Classification Search
None
See application file for complete search history.

(56) References Cited

U.S. PATENT DOCUMENTS 10,769,848 B1    9/2020  Wang et al.
12,158,762 B1 *  12/2024  O'Hara ................ G06F 40/284
(Continued)

OTHER PUBLICATIONS

Junnan Li, Dongxu Li, Silvio Savarese, and Steven Hoi. BLIP-2: Bootstrapping Language-Image Pre-training with Frozen Image Encoders and Large Language Models. arXiv:2301.12597v3 [cs.CV] Jun. 15, 2023.
(Continued)

*Primary Examiner* — Nurun Flora
(74) *Attorney, Agent, or Firm* — Haynes and Boone, LLP

(57) ABSTRACT

A method of training a neural network based three-dimensional (3D) encoder is provided. A first plurality of samples of a training dataset are generated using a first 3D model. An image generator with multi-view rendering is used to generate a plurality of two-dimensional (2D) images having different viewpoints of the first 3D model. A first language model is used to generate a plurality of texts corresponding to the plurality of 2D images respectively. A first text for a first image is generated by using one or more text descriptions generated by the first language model. A point cloud is generated by randomly sampling points in the 3D model. The first plurality of samples are generated using the plurality of 2D images, the corresponding plurality of texts, and the point cloud. The neural network based 3D encoder is trained using the training dataset including the first plurality of samples.

20 Claims, 14 Drawing Sheets

Related U.S. Application Data

(60) Provisional application No. 63/500,523, filed on May 5, 2023.

(56) References Cited

U.S. PATENT DOCUMENTS

| | | | |
|---|---|---|---|
| 12,327,228 B2 | 6/2025 | Damrow | |
| 2020/0320777 A1 | 10/2020 | Meshry et al. | |
| 2021/0279952 A1 | 9/2021 | Chen et al. | |
| 2021/0374947 A1 | 12/2021 | Shin et al. | |
| 2023/0074420 A1 | 3/2023 | Yin et al. | |
| 2023/0297617 A1 | 9/2023 | Guo | |
| 2024/0144589 A1* | 5/2024 | Liu | G06T 17/00 |
| 2025/0053391 A1* | 2/2025 | Upadhyay | G06F 8/72 |
| 2025/0157230 A1* | 5/2025 | Lee | G06V 20/64 |

OTHER PUBLICATIONS

Norman Mu, Alexander IGrillov, David Wagner, and Saiing Xie. SLIP: Self-supervision meets Language-Image Pr training. arXiv:2112.12750v1 [cs.CV] Dec. 23, 2021.

Le Xue, Mingfei Gao, Chen Xing, Roberto Martin-Martfn, Jiajun Wu, Caiming Xiong, Ran Xu, Juan Carlos Niebles, and Silvio Savarese. ULIP: Learning Unified Representation of Language, Image and Point Cloud for 3D Understanding. arXiv:2212.05171v1 [cs.CV] Dec. 10, 2022.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. "Learning transferable visual models from natural language supervision". In Proceedings of the 38th International Conference on Machine Learning, 16 pages. PMLR, 2021.

Renrui Zhang, Ziyu Guo, Wei Zhang, Kunchang Li, Xupeng Miao, Bin Cui, Yu Qiao, Peng Gao, and Hongsheng Li. "PointClip: Point cloud understanding by Clip". In Proceedings of the IEEE/CVF Conference on Computer Vision and Pattern Recognition, pp. 8552-8562, 2022.

\* cited by examiner

| Modality | ULIP-2 Objaverse Triplets | ULIP-2 Shapenet Triplets |
|---|---|---|
| 3D Point Clouds | ~ 800k | ~ 52.5k |
| Images | ~ 10 million | ~ 3 million |
| Language Descriptions | ~ 100 million | ~ 30 million |

FIG. 11

| Model | Pre-training dataset | Pre-training method | Manual captions? | Accuracy top-1 | top-5 |
|---|---|---|---|---|---|
| PointCLIP [50] | No multimodal pre-training | | | 20.2 | — |
| PointNeXt [45] | ShapeNet [13] | ULIP [22] | ✓ | 56.2 | 77.0 |
| | | ULIP-2 (ours) | ✗ | 64.5 (↑8.3) | 81.3 (↑4.2) |
| | Objaverse [47] | ULIP [22] | ✓ | 40.3 | 70.0 |
| | | ULIP-2 (ours) | ✗ | 49.0 (↑8.7) | 79.7 (↑9.7) |
| Point-BERT [46] | ShapeNet [13] | ULIP [22] | ✓ | 60.4 | 84.0 |
| | | ULIP-2 (ours) | ✗ | 66.4 (↑6.0) | 87.7 (↑3.7) |
| | Objaverse [47] | ULIP [22] | ✓ | 67.2 | 83.1 |
| | | ULIP-2 (ours) | ✗ | 70.2 | 87.0 |
| | | ULIP-2 * (ours) | ✗ | 74.0 (↑6.8) | 90.0 (↑6.9) |

FIG. 12

| Model | | | # Params (M) | Overall accuracy | Class-average accuracy |
|---|---|---|---|---|---|
| PointNet [43] | | | 3.5 | 68.2 | 63.4 |
| PointNet++ [44] | | | 1.5 | 77.9 | 75.4 |
| DGCNN [51] | | | 1.8 | 78.1 | 73.6 |
| MVTN [52] | | | 11.2 | 82.8 | – |
| RepSurf-U [53] | | | 1.5 | 84.6 | – |
| Point-MAE [54] | | | 22.1 | 85.2 | – |
| PointMLP [55] | | | 12.6 | 85.7 | 84.4 |
| Point-M2AE [56] | | | 15.3 | 86.43 | – |
| PointCMT [57] | | | 12.6 | 86.7 | 84.8 |
| ACT [58] | | | 22.1 | 88.21 | – |
| P2P [59] | | | – | 89.3 | – |
| I2P-MAE [23] | | | 12.9 | 90.11 | – |

| | Pre-training dataset | Pre-training methods | Manual captions? | | |
|---|---|---|---|---|---|
| Point-BERT [46] | – | – | – | 22.1 | 83.1 | – |
| | ShapeNet [13] | ULIP [22] | ✓ | 22.1 | 86.4 | – |
| | | ULIP-2 (ours) | ✗ | 22.1 | 86.7 (↑3.6) | – |
| | Objaverse [47] | ULIP [22] | ✓ | 22.1 | 88.7 | – |
| | | ULIP-2 (ours) | ✗ | 22.1 | 89.0 (↑5.9) | – |
| PointNeXt [45] | – | – | – | 1.4 | 87.5 | 85.9 |
| | ShapeNet [13] | ULIP [22] | ✓ | 1.4 | 89.7 | 88.6 |
| | | ULIP-2 (ours) | ✗ | 1.4 | 89.5 (↑2.0) | 88.8 (↑2.9) |
| | Objaverse [47] | ULIP [22] | ✓ | 1.4 | 90.1 | 89.2 |
| | | ULIP-2 (ours) | ✗ | 1.4 | 90.8 (↑3.3) | 90.3 (↑4.4) |
| | | ULIP-2 * (ours) | ✗ | 1.4 | 91.5 (↑4.0) | 91.2 (↑5.3) |

*FIG. 13*

| Model | Large multimodal models | Accuracy | |
|---|---|---|---|
| | | top-1 | top-5 |
| Point-BERT w/ ULIP-2 | BLIP [39] | 64.1 | 87.3 |
| | BLIP-2 [40] | 66.4 | 87.7 |

FIG. 14

| Model | Pre-training dataset | # Views | Accuracy | |
|---|---|---|---|---|
| | | | top-1 | top-5 |
| Point-BERT w/ ULIP-2 | Objaverse | 2 | 61.5 | 81.4 |
| | | 6 | 67.9 | 87.0 |
| | | 12 | 70.2 | 87.0 |
| | ShapeNet | 2 | 55.5 | 77.1 |
| | | 15 | 64.2 | 85.3 |
| | | 30 | 66.4 | 87.7 |

FIG. 15

| Model | # captions generated | Top-k selected | Accuracy | |
|---|---|---|---|---|
| | | | top-1 | top-5 |
| Point-BERT w/ ULIP-2 | 10 | 3 | 66.7 | 87.2 |
| | | 5 | 66.4 | 87.7 |
| | | 10 | 66.3 | 85.1 |

FIG. 16

SYSTEMS AND METHODS FOR MULTIMODAL PRETRAINING FOR THREE-DIMENSIONAL UNDERSTANDING MODELS

CROSS REFERENCE(S)

The instant application is a nonprovisional of and claims priority under 35 U.S.C. 119 to U.S. provisional application No. 63/500,523, filed May 5, 2023, and is a continuation-in-part of U.S. application Ser. No. 18/182,939, filed Mar. 13, 2023, which are hereby expressly incorporated by reference herein in their entirety.

TECHNICAL FIELD

The embodiments relate generally to three dimensional (3D) visual models and machine learning systems, and more specifically to methods and systems for multimodal pretraining for 3D understanding models.

BACKGROUND

Machine learning systems and neural models have been adopted for 3D-visual understanding technology. 3D understanding technology comprehends and interprets 3D objects and environments. It often involves the process of perceiving, recognizing, and interpreting the spatial relationships, shapes, sizes, and textures of objects in three-dimensional space. For example, in computer vision and robotics, 3D visual understanding involves the use of sensors, cameras, and algorithms to perceive and analyze the 3D structure of objects and environments. This allows machines to interact with and manipulate objects in the real world. In addition, 3D visual understanding has various applications in fields such as virtual reality, augmented reality, autonomous driving, robotics, and medical imaging.

However, compared to their 2D counterpart, 3D visual understanding is often limited by datasets with a small number of samples and a small set of pre-determined categories. The scale limit of 3D data, caused by the high cost of 3D data collection and annotation, has been hindering the generalization of 3D visual understanding models and their real-world applications.

Therefore, there is a need for developing improved 3D visual understanding technology.

BRIEF DESCRIPTION OF THE DRAWINGS

FIGS. 11-16 provide example experimental results illustrating example data performance of the 3D visual understanding model described in relation to FIGS. 1-12, according to some embodiments described herein.

Figure 1:
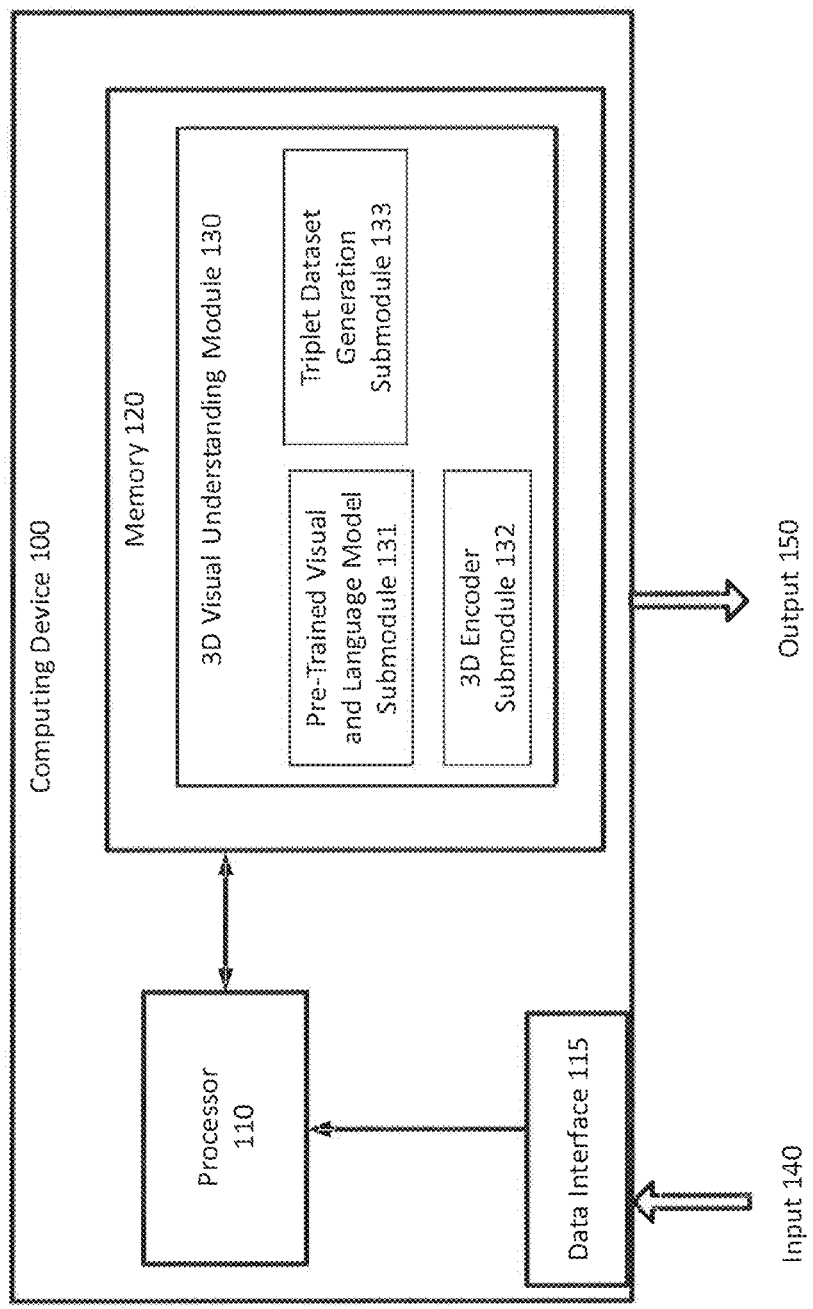
FIG. 1 is a simplified diagram illustrating a computing device implementing the 3D visual understanding framework described throughout the specification, according to one embodiment described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Due to the increasing demands of real-world applications such as augmented virtual reality, autonomous driving, and robotics, 3D visual understanding has been drawing significant attention in recent years. However, compared to their 2D counterpart, 3D visual understanding is often limited by datasets with a small number of samples and a small set of pre-determined categories. The scale limit of 3D data, caused by the high cost of 3D data collection and annotation, has been hindering the generalization of 3D visual understanding models and their real-world applications.

In view of the need for an improved 3D visual understanding model, embodiments described herein provide a 3D visual understanding framework (also referred to as ULIP-2) for 3D visual understanding by using an innovative approach to generate well-aligned, holistic multimodal data for 3D understanding, and then learning unified representations of image, text, and point cloud using that multimodal data. As such, multimodal learning is achieved by the innovative generation of multimodal data, together with an efficient multimodal pre-training architecture capable of aligning this multimodal data.

A vision language model that is pre-trained on massive image-text pairs may be used for generating representations of image and text. The features from 3D point cloud may be aligned to the vision/language feature space. This strategy enables the 3D visual understanding framework to leverage the abundant semantics captured in the vision/language feature spaces, so that they help 3D understanding.

Specifically, an arbitrary 3D backbone model (e.g., a 3D encoder) may be pre-trained on a training dataset, where the data samples are object triplets including image, text and point cloud. The pre-trained 3D backbone model may be further fine-tuned for different downstream tasks. Given that there are no annotated object triplets available in public datasets, a method for creating such triplets from existing dataset of 3D shapes without requiring manual annotations is described.

By learning unified representations of language, image, and point cloud, recognition ability of 3D backbone models is substantially improved. Further, it is agnostic to the architecture of 3D backbone models. Therefore, an arbitrary 3D backbone model may be improved by the learning of unified representations. Additionally, aligning three modalities (language, image, and point cloud) in the same feature space may enable more cross-domain downstream tasks including zero shot 3D classification and text-to-3D/image-to-3D retrieval.

The embodiments described herein provide a ULIP-2 framework, which in addition to learning unified representations of language, image, and point cloud (referred to as ULIP), provides improvements by using an innovative approach to generate well-aligned, holistic multimodal data for 3D understanding. Language modality for 3D is a critical bottleneck in this process. While category names and short descriptions may be derived from metadata as the language counterparts for the 3D data, those approaches rely on some extent of human annotations and the dataset collection process, which is hard to scale up. Furthermore, existing methods are not comprehensive enough as the derived language information might not provide sufficient details and lacks variations. This highlights the need for an innovative paradigm to generate language counterparts for 3D data that are both scalable and comprehensive, thereby truly harnessing the potential of multimodal learning. ULIP-2 provides a novel framework that encompasses an innovative approach to generate well-aligned, holistic multimodal data for 3D understanding, coupled with an efficient multimodal pre-training architecture capable of aligning this multimodal data, thereby harnessing the full potential of multimodal learning.

FIG. 1 is a simplified diagram illustrating a computing device implementing the 3D visual understanding framework described throughout the specification, according to one embodiment described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for 3D visual understanding module 130 (also referred to as 3D classification module 130) that may be used to implement and/or emulate the systems and models, and/or to implement any of the methods described further herein. A 3D visual understanding module 130 may receive input 140 such as an 3D input via the data interface 115 and generate an output 150 which may be a prediction of the 3D classification task.

The data interface 115 may comprise a communication interface, a user interface (such as a voice input interface, a graphical user interface, and/or the like). For example, the computing device 100 may receive the input 140 (such as a training dataset) from a networked database via a communication interface. Or the computing device 100 may receive the input 140 from a user via the user interface.

In some embodiments, the 3D visual understanding module 130 is configured to perform a classification task. The 3D visual understanding module 130 may further include a pretrained visual and language model submodule 131, a 3D encoder submodule 132, a triplet dataset generation submodule 133, which are all further described below. In one embodiment, the 3D visual understanding module 130 and its submodules 131-133 may be implemented by hardware, software and/or a combination thereof.

In one embodiment, the 3D visual understanding module 130 and one or more of its submodules 131-133 may be implemented via an artificial neural network. The neural network comprises a computing system that is built on a collection of connected units or nodes, referred to as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 120 as a structure of layers of neurons, and parameters describing the non-linear transformation at each neuron and the weights associated with edges connecting the neurons. An example neural network may be PointNet++, PointBERT, PointMLP, and/or the like.

In one embodiment, the neural network based 3D visual understanding module 130 and one or more of its submodules 131-133 may be trained by updating the underlying parameters of the neural network based on the loss described in relation to training the neural network based 3D encoder described in detail below. For example, given the loss computed according to Eqs. (4) and (5), the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate 3D representations aligned with the text representations and image representations.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
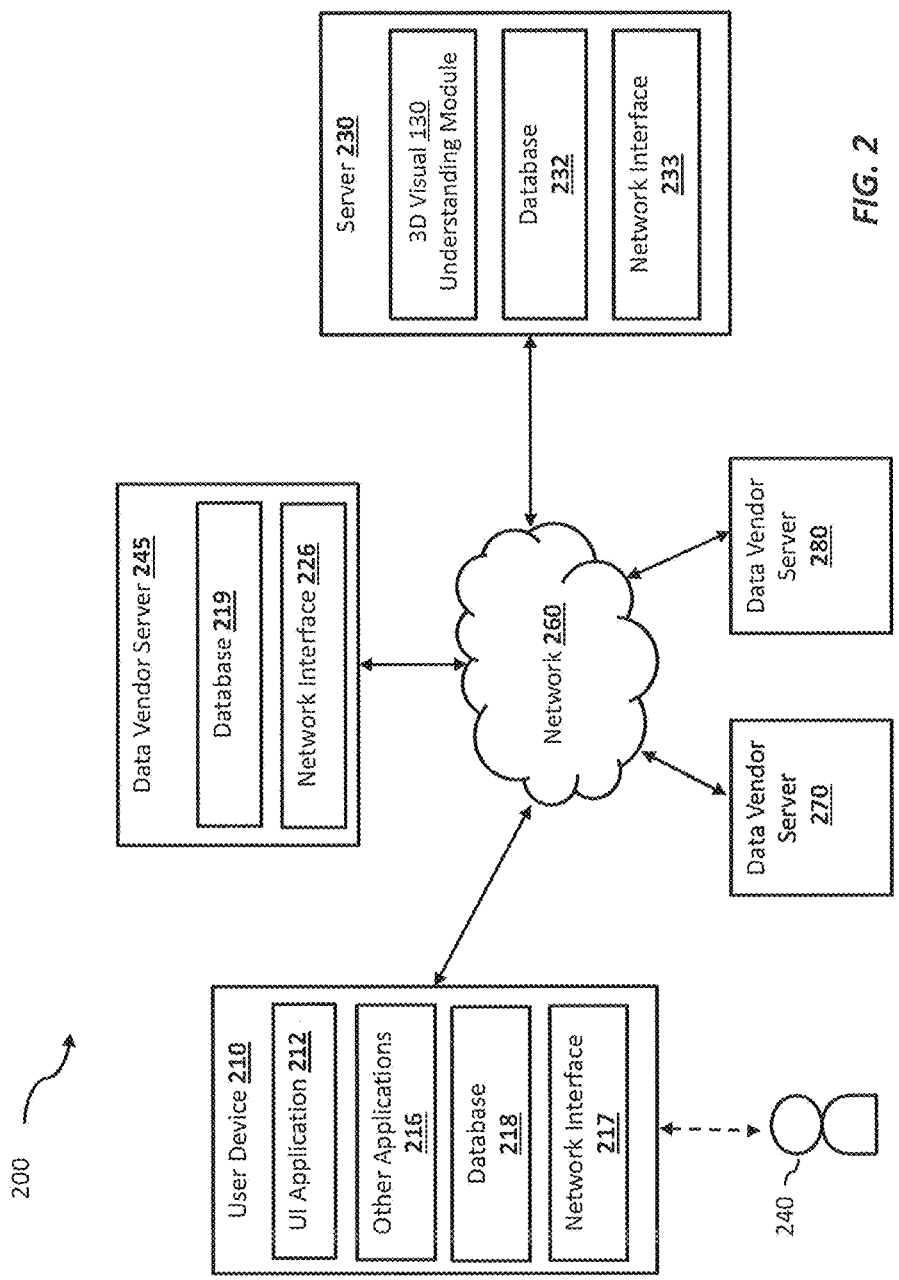
FIG. 2 is a simplified diagram of a networked system suitable for implementing the 3D visual understanding framework, according to some embodiments.

FIG. 2 is a simplified block diagram of a networked system suitable for implementing the 3D visual understanding framework in embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating a classification of a 3D classification task from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the prediction/classification result.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or collectively referred to as 203) to provide training datasets including training images and questions to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the 3D visual understanding module 130 (also referred to as ULIP-2 module 130) and its submodules described in FIG. 1. In some implementations, module 130 may receive data from database 219 at the data vendor server 245 via the network 260 to generate a classification for a classification task. The generated classification may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the 3D visual understanding model 130. In one implementation, the database 232 may store previously generated classifications, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
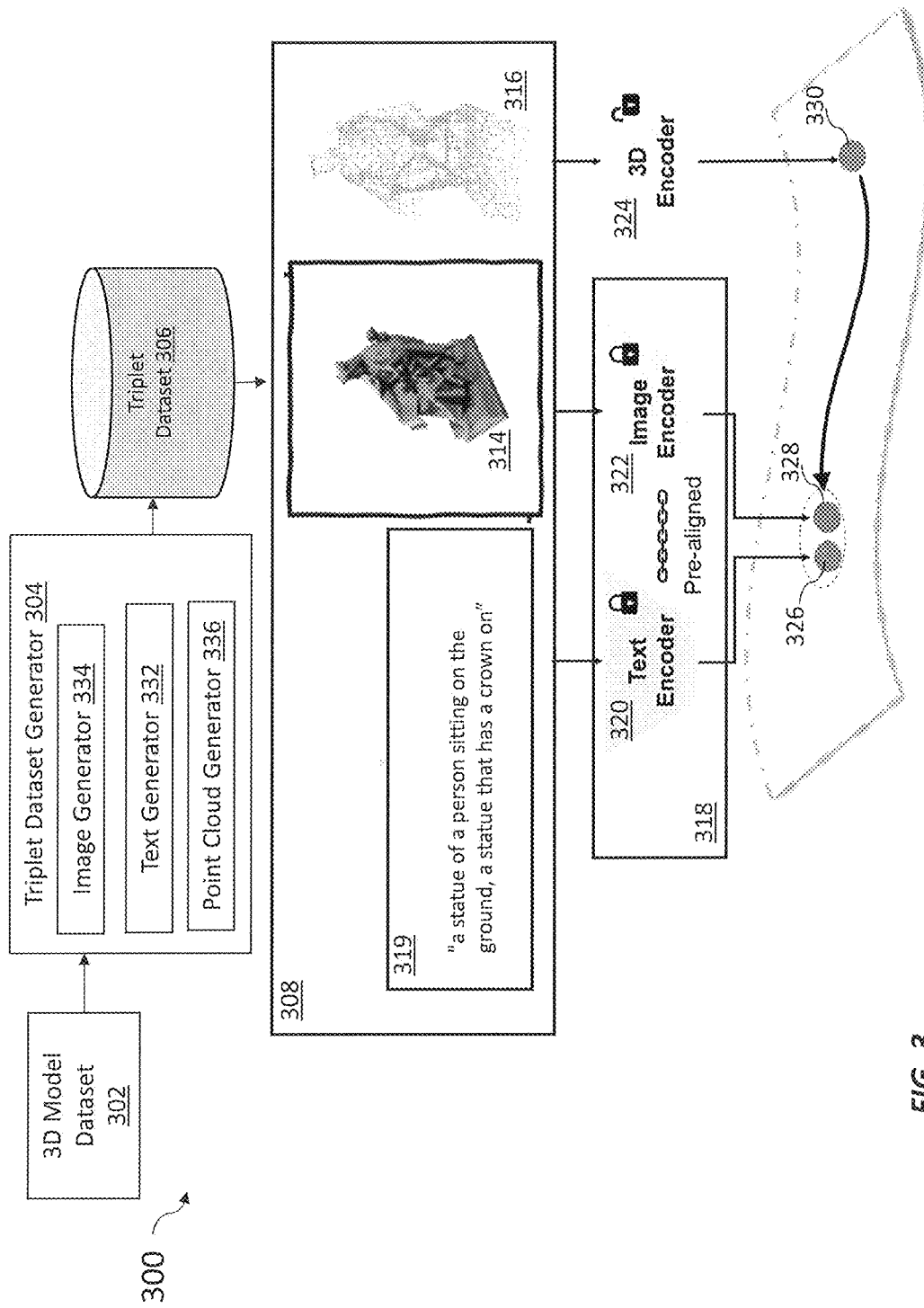
FIG. 3 is a simplified block diagram illustrating the framework of a 3D visual understanding model, according to one embodiment described herein.

FIG. 3 is a simplified diagram illustrating an example neural network structure implementing one or more neural network models of the 3D visual understanding module 130 described in FIG. 1, according to some embodiments.

Figure 17:
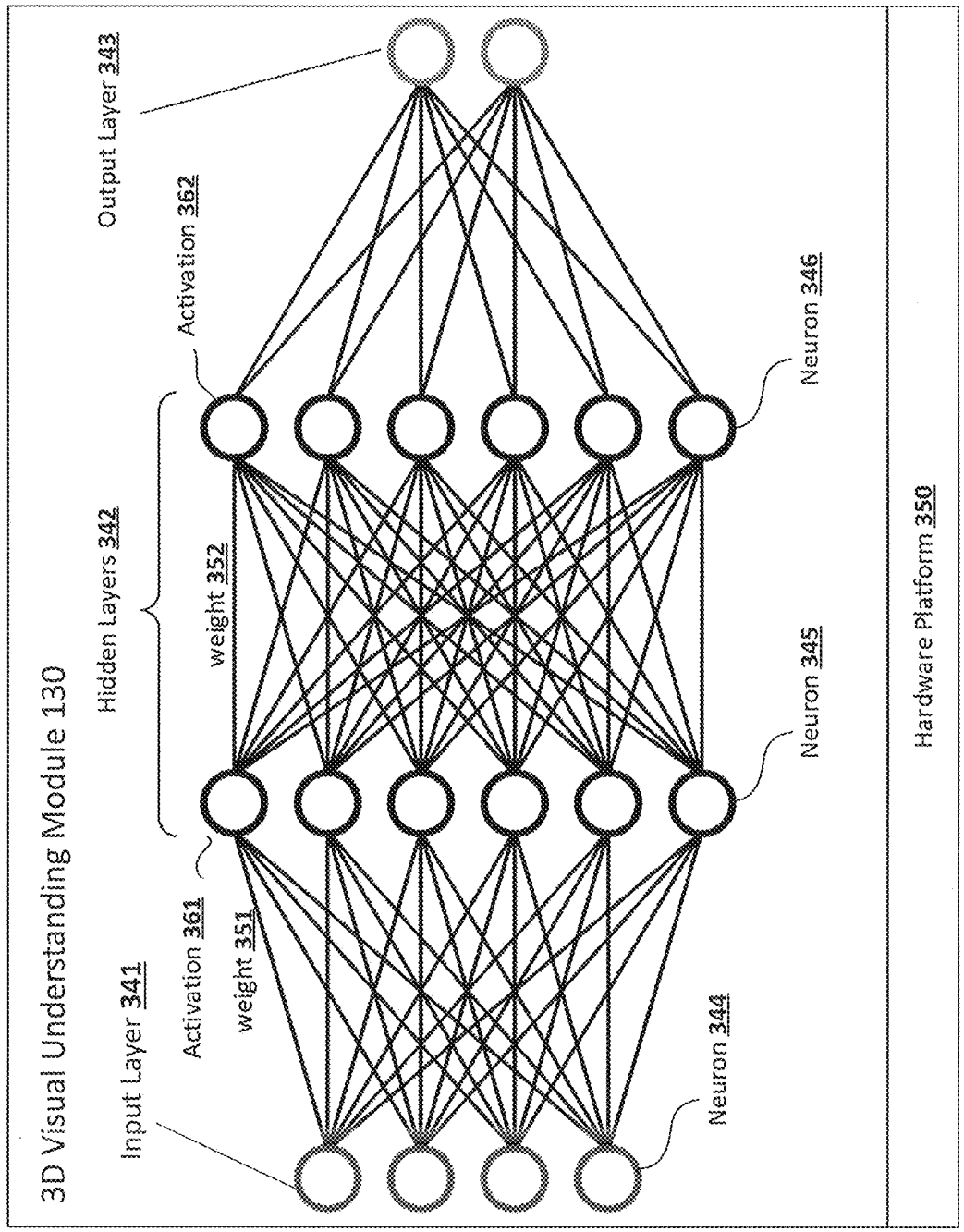
FIG. 17 is a simplified diagram illustrating an example neural network structure implementing one or more neural network models of the 3D visual understanding module 130 described in FIG. 1, according to some embodiments.

Referring to FIG. 17, a simplified diagram illustrates an example neural network structure implementing the 3D visual understanding module 130 described in FIG. 1, according to one embodiment described herein. In one embodiment, the 3D visual understanding module 130 and/or one or more of its submodules 131-133 may be implemented via an artificial neural network structure shown in FIG. 17. The neural network comprises a computing system that is built on a collection of connected units or nodes, referred to as neurons (e.g., 344, 345, 346). Neurons are often connected by edges, and an adjustable weight (e.g., 351, 352) is often associated with the edge. The neurons are often aggregated into layers such that different layers may perform different transformations on the respective input and output transformed input data onto the next layer.

For example, the neural network architecture may comprise an input layer 341, one or more hidden layers 342 and an output layer 343. Each layer may comprise a plurality of neurons, and neurons between layers are interconnected according to a specific topology of the neural network topology. The input layer receives the input data (e.g., an input question). The number of nodes (neurons) in the input layer 341 may be determined by the dimensionality of the input data (e.g., the length of a vector of the input question). Each node in the input layer represents a feature or attribute of the input.

The hidden layers 342 are intermediate layers between the input and output layers of a neural network. It is noted that two hidden layers 342 are shown in FIG. 3 for illustrative purpose only, and any number of hidden layers may be utilized in a neural network structure. Hidden layers 342 may extract and transform the input data through a series of weighted computations and activation functions.

For example, as discussed in FIG. 1, the 3D visual understanding module 130 receives an input 140 of a question, and its semantic parsing submodule generates an output of a representation corresponding to the input question. To perform the transformation, each neuron receives input signals, performs a weighted sum of the inputs according to weights assigned to each connection (e.g., 351, 352), and then applies an activation function (e.g., 361, 362, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 341 is transformed into rather different values indicative data characteristics corresponding to a task that the neural network structure has been designed to perform.

The output layer 343 is the final layer of the neural network structure. It produces the network's output or prediction based on the computations performed in the preceding layers (e.g., 341, 342). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the 3D visual understanding module 130 and/or one or more of its submodules 131-133 may comprise the transformative neural network structure of layers of neurons, and weights and activation functions describing the non-linear transformation at each neuron. Such a neural network structure is often implemented on one or more hardware processors 110, such as a graphics processing unit (GPU). An example neural network may be a T5 model, a generative encoder-decoder model (e.g., FiD), and/or the like.

In one embodiment, the 3D visual understanding module 130 and its submodules 131 and 132 may be implemented by hardware, software and/or a combination thereof. For example, the 3D visual understanding module 130 and its submodules 131 may comprise a specific neural network structure implemented and run on various hardware platforms 350, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware platform 350 used to implement the neural network structure is specifically configured depends on factors such as the complexity of the neural network, the scale of the tasks (e.g., training time, input data scale, size of training dataset, etc.), and the desired performance.

In one embodiment, the neural network based 3D visual understanding module 130 and one or more of its submodules 131-133 may be trained by iteratively updating the underlying parameters (e.g., weights 351, 352, etc., bias parameters and/or coefficients in the activation functions 361, 362 associated with neurons) of the neural network based on the loss. For example, during forward propagation, the training data such as input questions and paragraphs are fed into the neural network. The data flows through the network's layers 341, 342, with each layer performing computations based on its weights, biases, and activation functions until the output layer 343 produces the network's output 150.

The output generated by the output layer 343 is compared to the expected output (e.g., a "ground-truth" such as the corresponding correct answer for an input question) from the training data, to compute a loss function that measures the discrepancy between the predicted output and the expected output. For example, the loss function may be cross entropy, MMSE, any other suitable loss functions, or a combination thereof. Given the loss, the negative gradient of the loss function is computed with respect to each weight of each layer individually. Such negative gradient is computed one layer at a time, iteratively backward from the last layer 343 to the input layer 341 of the neural network. These gradients quantify the sensitivity of the network's output to changes in the parameters. The chain rule of calculus is applied to efficiently calculate these gradients by propagating the gradients backward from the output layer 343 to the input layer 341.

Parameters of the neural network are updated backwardly from the last layer to the input layer (backpropagating) based on the computed negative gradient using an optimization algorithm to minimize the loss. The backpropagation from the last layer 343 to the input layer 341 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as performing question answering tasks.

Therefore, the training process transforms the neural network into an "updated" trained neural network with updated parameters such as weights, activation functions, and biases. The trained neural network thus improves neural network technology in question answering systems.

Referring to FIG. 3, a simplified block diagram illustrates an example 3D visual understanding framework 300 for enhancing a 3D encoder by learning unified representations of language, image and point cloud (also referred to as the ULIP-2 framework 300), according to one embodiment described herein. As shown in FIG. 3, the framework 300 provides a 3D model dataset 302 to a triplet dataset generator 304. The 3D model dataset 302 may include a plurality of 3D models, each 3D model may represent a 3D object, e.g., using a collection of points in 3D space, connected by various geometric entities such as triangles, lines, curved surfaces, etc. The 3D models may be provided in various 3D file formats, including e.g., STEP, CAD, STL, etc.

In various embodiments, the triplet dataset generator 304 may generate triplet dataset 306 including a plurality of triplet samples using the plurality of 3D models from the 3D model dataset 302. A triplet sample may include corresponding text, image, and point cloud for the same 3D object. For example, an example triplet sample 308 for a 3D object (e.g., a statute) includes a text 319 (e.g., generated using a plurality of text descriptions "a statue of a person sitting on the ground", "a statue that has a crown on," "a statue of a man on a bench"), an image 314 (e.g., an image of the statute), and a point cloud 316 (e.g., a point cloud of the statute). The triplet dataset generator 304 may include an image generator 334 for generating images from the 3D model. The triplet dataset generator 304 may also include a text generator 332 for generating the text 319 (e.g., based on images generated by image generator 334), and a point cloud generator 336 for generating the point cloud 315 from the 3D model.

As shown in FIG. 3, the triplet dataset 306 is used to train a 3D encoder 324, using a pre-trained vision-language model 318. The pretrained vision-language neural model 318 includes a text encoder 320 and an image encoder 322, which are pre-aligned by pre-training the vision-language neural model 318. An example of the pretrained vision-language neural model is the Contrastive Language-Image Pre-Training (CLIP) model. During the training process, the text encoder 320 generates text representations 326 of the text 319. The image encoder 322 generates image representations 328 of the image 314. The 3D encoder 324 generates 3D representations 330 of the point cloud 316. As shown in FIG. 3, text representations 326 and image representations 328 are already aligned in the feature space because the text encoder 320 and image encoder 322 are pre-aligned. During the training process, the neural network based 3D encoder 324 is trained by aligning the 3D representations 330 with the text representations 326 and the image representations 328 in the same feature space.

Figure 4:
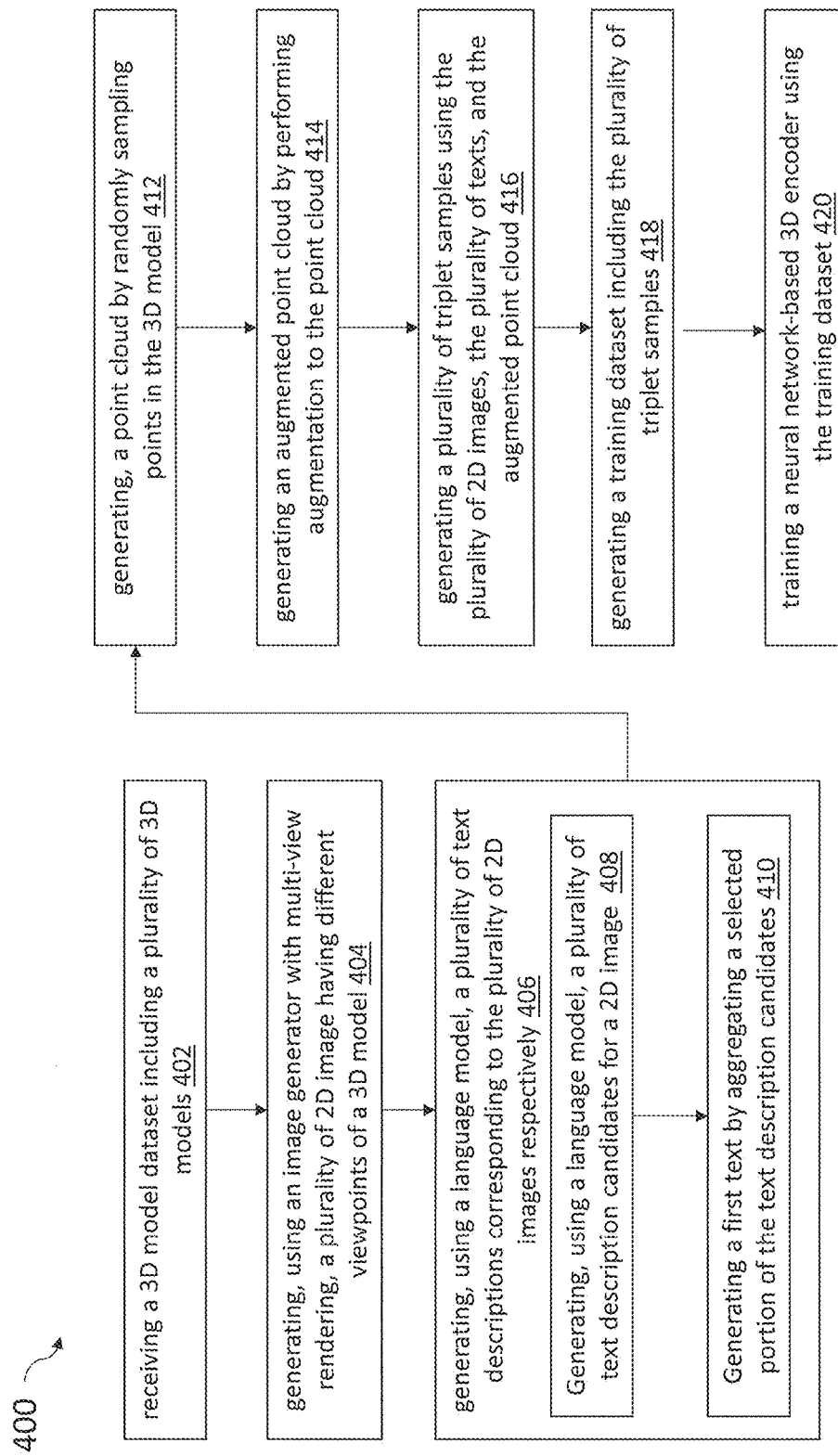
FIG. 4 is an example logic flow diagram illustrating a method of generating a training dataset including triplet samples (also referred to as triplets) and training a neural network model using the training dataset, according to some embodiments described herein.
Figure 5:
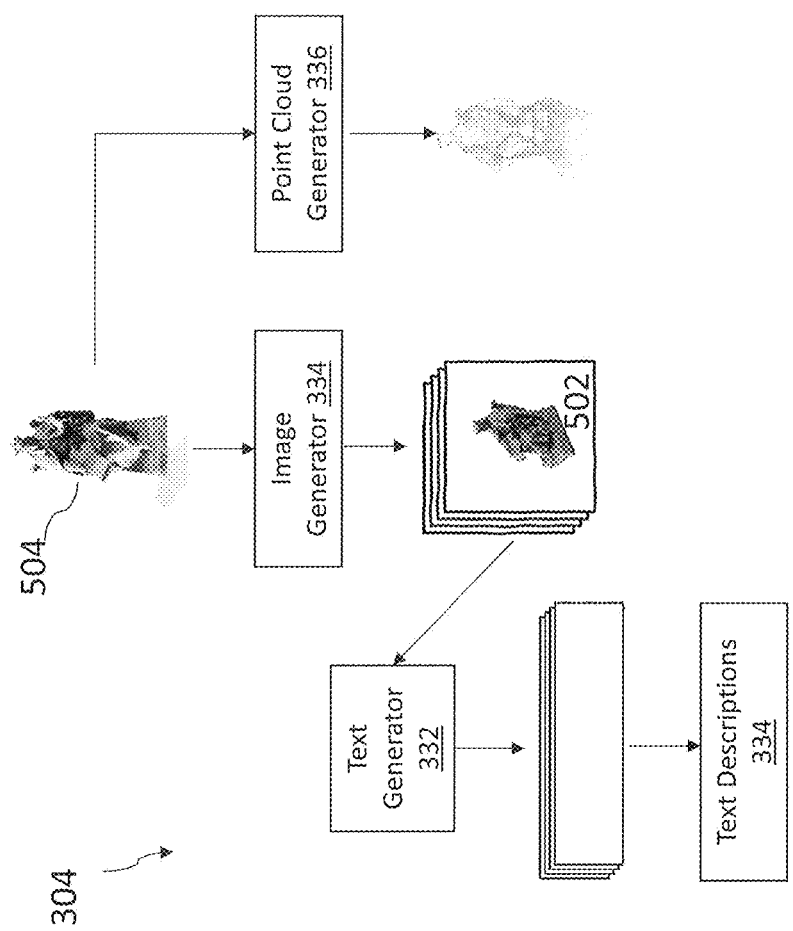
FIG. 5 is a simplified diagram illustrating an example triplet sample generator for generating triplet samples of the training dataset, according to some embodiments described herein.
Figure 6:
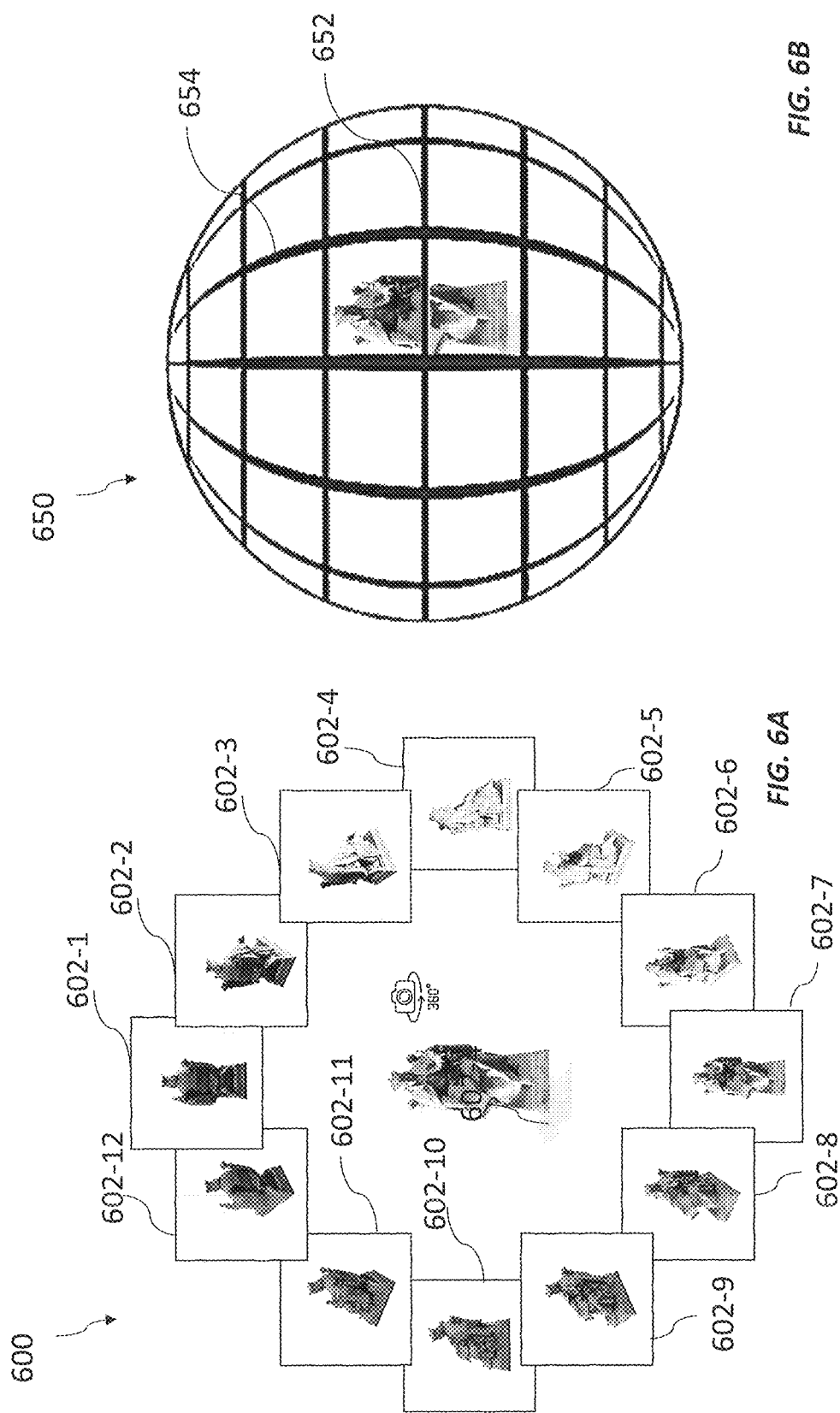
FIG. 6A illustrates an example of generating images for generating the triplet samples of the training dataset, according to some embodiments described herein.
FIG. 6B illustrates another example of generating images for generating the triplet samples of the training dataset, according to some embodiments described herein.

Referring to FIGS. 4, 5, 6A, and 6B, example methods for generating a training dataset including a plurality of triplet samples for 3D objects is described. FIG. 4 is a simplified block diagram illustrating an example method 400 for generating a training dataset including a plurality of triplet samples for 3D objects. FIG. 5 is a simplified diagram illustrating an example triplet sample generator for generating triplet samples of the training dataset. FIGS. 6A and 6B illustrate example methods for generating images for generating the triplet samples of the training dataset.

Referring to FIG. 4, the method 400 begins at block 402, where a triplet dataset generator (e.g., triplet dataset generator 304 of FIG. 3) receives a 3D model dataset including a plurality of 3D models.

The method 400 may proceed to block 404, where an image generator (e.g., image generator 334 of FIG. 3) may generate a plurality of images based on the 3D model. As shown in FIG. 5, the image generator 334 may generate a plurality of images 502 based on the 3D model 504.

Referring to FIGS. 6A and 6B, in various embodiments, the image generator may generate a plurality of images having different viewpoints of a 3D model (e.g., using multi-view rendering). For example, multi-view images of each 3D model (e.g., a CAD model) may be generated by placing virtual cameras around each 3D object and rendering the corresponding RGB images and depth maps from different viewpoints. A virtual camera may include a software-based camera that may capture and manipulate images or videos in a computer-generated environment. The virtual camera may be controlled by the image generator to provide different perspectives and angles of the 3D object. In an example, an RGB image with a depth map is rendered for every 12 degrees, and in total, 30 RGB images and 30 depth maps may be generated for each 3D object, 60 image candidates in total for each 3D object.

In the example of FIG. 6A, with image generation configuration 600 for the image generator, the image generator is configured to generate an RGB image by a virtual camera for every 30 degrees on a 360-degree circle around the center of the 3D object, so that 12 images of the 3D object are generated. In the example of FIG. 6B, with some image generator configuration 650, multiple 360-degree circles (e.g., one or more horizontal circles 652, one or more vertical circles 654, and/or a combination thereof) may be used to place the virtual cameras for capture images of different viewpoints (e.g., viewpoints evenly distributed on the one or more 360-degree circles).

Referring to FIG. 4, the method 400 may proceed to block 406, where the text generator may generate, using a language model, a plurality of texts corresponding to the plurality of 2D images respectively.

Block 406 includes blocks 408 and 410. At block 408, a text generator (e.g., text generator 332 of FIG. 3) of the triplet dataset generator may use a language model (e.g., BLIP-2) to a plurality of text description candidates for a 2D image. Referring to the example of FIG. 5, the text generator 332 receives the plurality of images 502 generated by the image generator 334. For each image of the plurality of images 502, the text generator 332 may generate a plurality of text description candidates.

Referring to the example of FIG. 6A, for each of the cl through 602-12, a plurality of text description candidates are generated. Example plurality of text description candidates for each image are provided in the table below. These images are rendered from a set of holistic viewpoints of a 3D object. In some views, the chair is not visible, while in other views, the sword/scepter cannot be seen. As such, combining descriptions of complete views helps the model to learn comprehensive and holistic information about the 3D object.

| Image | Text Description Candidates |
|---|---|
| Image 602-1 | "a statue has a chair on the back", "a statue of a man sitting on a throne", "a statue that is sitting in a garden" |
| Image 602-2 | "a statue of a man sitting on a chair", "a sculpture of a guy sitting on a throne with his legs crossed", "a sculpture of a person sitting on a chair" |
| Image 602-3 | "a small sculpture sitting on top of a grayish surface", "a statue is displayed against a tan background", "a statue on a pedestal on top of a gray background" |
| Image 602-4 | "a small statue of a woman in a cloak sitting on a throne", "a small statue of a man sitting on a throne", "a statue of a person that is sitting down" |
| Image 602-5 | "an image of a statue on a grey surface", "a white sculpture of a man on a throne", "a statue is shown on a gray background" |
| Image 602-6 | "statue of king benjamin on a grey background", "a white statue of an old man sitting on a throne", "there is a white sculpture of a man sitting down" |
| Image 602-7 | "a statue holding a book and a scepter", "a statue of a figure with a crown, and a sword on a table", "a small stone statue with a book and writing tool" |
| Image 602-8 | "an image of a statue on a gray surface", "sculpture in 3d shows the king of the court, riding a white horse", "a statue with a robe and a crown" |
| Image 602-9 | "a statue of a person sitting on the ground", "a statue that has a crown on", "a statue of a man on a bench" |
| Image 602-10 | "statue of an old woman on a gray floor", "a statue of a woman on a throne", "a statue of a woman sitting on a throne" |
| Image 602-11 | "a statue that is sitting in a very still scene", "this statue shows an old woman and child seated at a desk", "a statue of a person on a chair with a child" |
| Image 602-12 | "a statue on a chair in gray color", "a statue is sitting on a chair", "a statue of a sitting man on a chair" |

Referring back to FIG. 4, at block 410, for each image, the text generator may rank the generated text description candidates, and form the text (language modality) in the triplet (e.g., by choosing the top-1 or aggregating the top-k sentences). This text generation enables scalable triplet creation approach, which facilitates dataset scaling, eliminating the need for dataset metadata collection and/or human annotations, and necessitating only the 3D data itself. As such, the ULIP-2 framework is capable of aligning 3D representations with holistic image-text pairs in any unannotated dataset, thereby providing a more comprehensive and scalable solution for 3D understanding.

The method 400 may proceed to block 412, where a point cloud generator (e.g., point cloud generator 336 of FIG. 3) of the triplet dataset generator may generate a point cloud by randomly and/or uniformly sampling the points in the 3D model. The method 400 may proceed to block 414, where the point cloud generator may perform augmentation (e.g., random point drop, random scaling point cloud, shift point cloud and rotate perturbation, other suitable augmentation method, and/or a combination thereof) to the point cloud to generate an augmented point cloud.

The method 400 may proceed to block 416, where the triplet dataset generator generates a plurality of triplet samples using the plurality of 2D images, the plurality of texts, and the augmented point cloud. Each triplet sample includes a 2D image, a corresponding text, and the point cloud (e.g., with augmentation or without augmentation).

The method 400 may proceed to block 418, where additional triplet samples may be generated using the plurality of 3D models, e.g., a plurality of triplet samples are generated by repeating steps 404-416 for each 3D model. At block 420, a training dataset including the plurality of triplet samples is used to train a neural network based 3D encoder. The trained 3D encoder may be used to perform various 3D visual understanding tasks.

In some embodiments, the training dataset including triplet samples is generated using method 400 from ShapeNet, which is one of the largest public 3D CAD datasets. It contains around 52.5K CAD models, each of which is associated with meta data that textually describes the semantic information of the CAD model. For each CAD model i in the dataset, a plurality of triplet samples $T_i:(I_i, S_i, P_i)$ including image $I_i$, text description $S_i$ and point cloud $P_i$ may be generated. ULIP-2 will then use these triplets for training.

Figure 7:
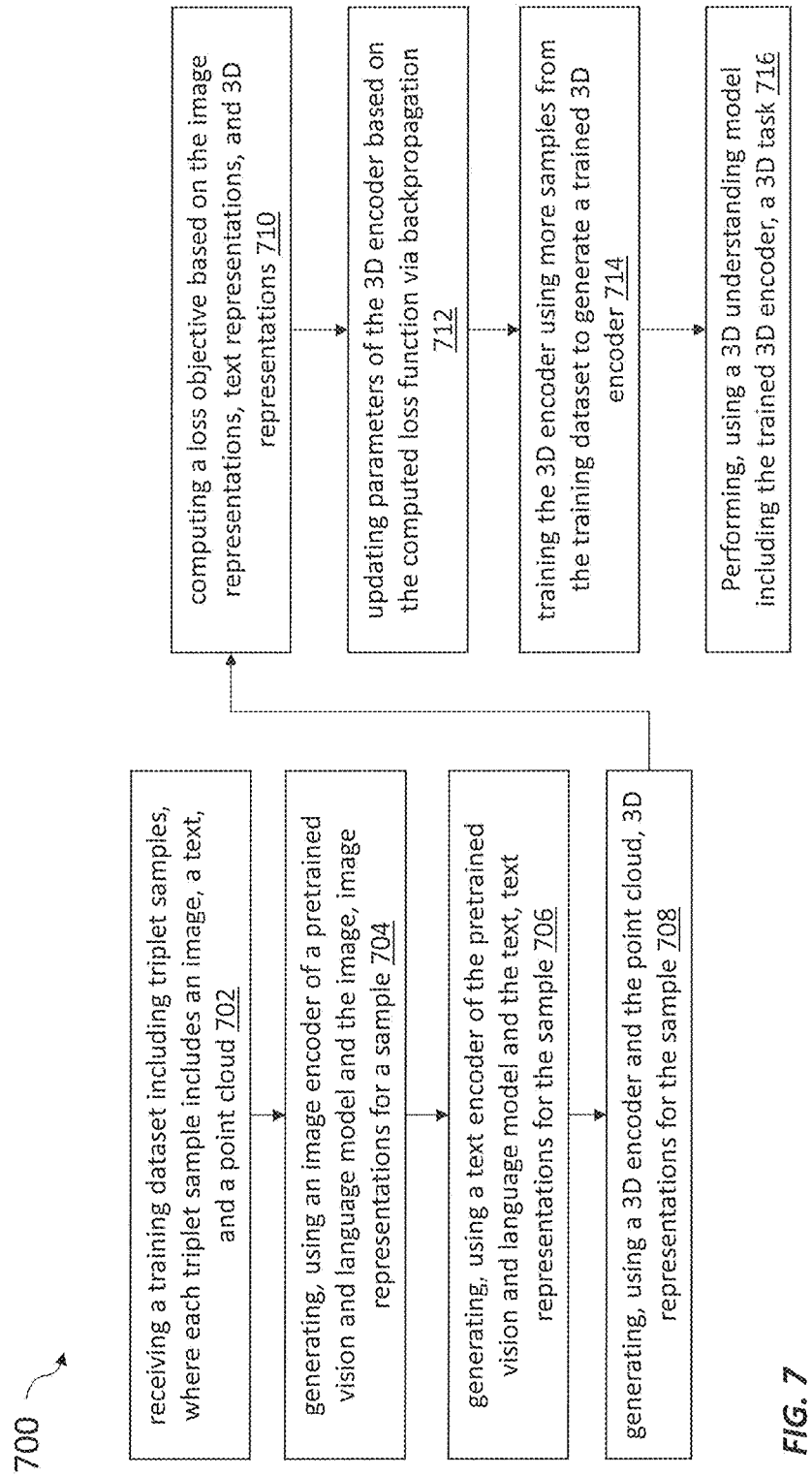
FIG. 7 is an example logic flow diagram illustrating an example method of training a 3D encoder using a training dataset including triplet samples and using the trained 3D encoder to perform a 3D task, according to one embodiment described herein.

Referring to FIG. 7, illustrated is a simplified block diagram illustrating an example method 700 of training a 3D encoder of 3D visual understanding model by learning unified representations of language, image and point cloud, and using the trained 3D encoder to perform a 3D task, according to one or more embodiments described herein. The method 700 begins at block 702, where a training dataset including triplet samples is received. Each triplet sample may include an image, a text, and a point cloud for a 3D object. The method 700 may proceed to blocks 704 and 706, where a pretrained vision language model that is pretrained on massive image-text pairs is used for generating representations of image and text, such that the image representations and text representations of the 3D object are already aligned. Specifically, at block 704, an image encoder of the pretrained vision and language model is used to generate image representations using the image of a triplet sample. At block 706, a text encoder of the pretrained vision and language model is used to generate image representations using the image of a triplet sample. At block 708, a 3D encoder is used to generate 3D representations for the sample from the point cloud.

At block 710, a loss objective is computed to align the image representations, the text representations, and the 3D representations for the sample. At block 712, parameters of the neural network based 3D encoder are updated based on the computed loss function via backpropagation. Parameters of the neural network based 3D encoder may be updated based on the loss objective while the pretrained vision language model is frozen.

At block 714, the neural network based 3D encoder is further trained using more samples from the training dataset, and a trained 3D encoder is generated.

At block 716, a 3D visual understanding model including the trained 3D encoder is used to perform a 3D task.

Figure 8:
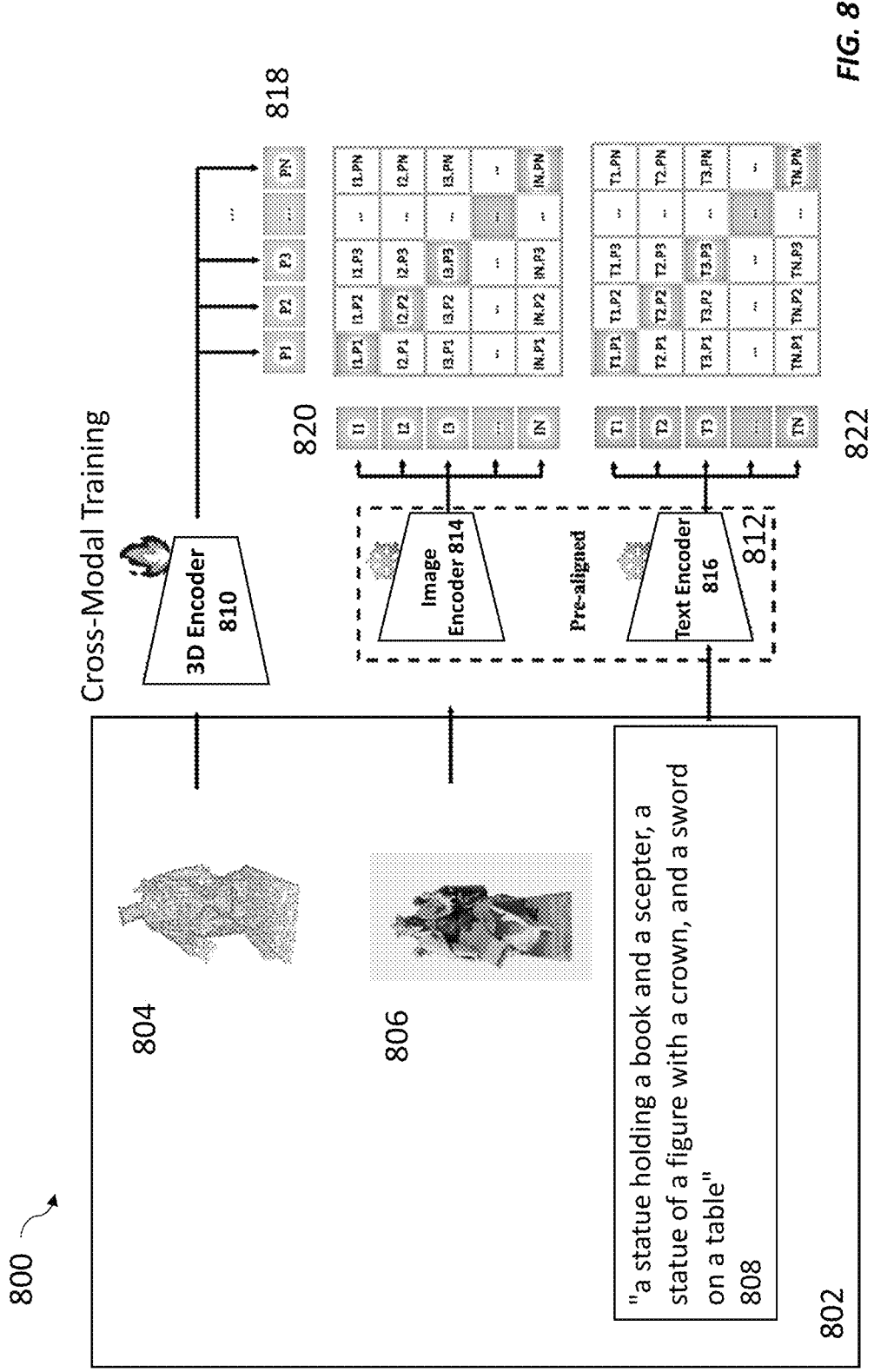
FIG. 8 is a simplified block diagram illustrating an example cross-modal training framework for training a 3D encoder using a training dataset including triplet samples, according to one embodiment described herein.

Referring to FIG. 8, illustrated therein is an example cross-modal training framework 800 for training a 3D encoder using a training dataset including triplet samples is illustrated. With the created triplet samples each including an image, a text, and a point cloud, ULIP conducts the cross-modal training process to align representations of all the three modalities into the same feature space. Specifically, pre-trained vision-language models, i.e., CLIP, are used together to train a 3D encoder by aligning the 3D feature with the features of image and text encoders ($f_I(\cdot)$ and $f_S(\cdot)$) of CLIP. By doing so, the abundant semantics that are already captured and aligned by CLIP's encoders can be employed for better 3D understanding. The resulting unified feature space not only enable numerous multi-modal applications among these three modalities, but also potentially improve the 3D visual understanding performance of the 3D backbone encoder $f_P(\cdot)$.

As shown in the example of FIG. 8, during the cross-modal training, a triplet sample 802 of a training dataset is provided to a 3D encoder 810 and a pre-trained language-visual model 812. The pre-trained language-visual model 812 includes an image encoder 814 and a text encoder 816, wherein the image encoder 814 and text encoder 816 are pre-aligned by the pre-training of the language-visual model. Each triplet sample 802 includes a point cloud 804, an image 806, and one or more text descriptions 808 for a 3D object.

As shown in FIG. 8, during the training process, the parameters of the image encoder 814 and text encoder 816 are frozen, and the parameters of the neural network based 3D encoder 810 may be updated during backpropagation. Specifically, for a triplet sample for a 3D model i, the neural network based 3D encoder 810 generates 3D representations 818 (also denoted as $h_i^P$) using the point cloud 804 of the triplet sample 802. In an example, the 3D representations 818 may be generated as follows:

$$h_i^P = f_P(P_i), \qquad (1)$$

where $f_P(\cdot)$ represents the neural network based 3D encoder.

In various embodiments, the image encoder 814 generates image representations 820 (also denoted as $h_i^I$) using the image 806 of the triplet sample 802, e.g., as follows:

$$h_i^I = f_I(I_i), \qquad (2)$$

where $f_I(\cdot)$ represents the image encoder.

In some embodiments, the text encoder 816 generates text representations 822 (also denoted as $h_i^S$) using the one or more text descriptions 808 of the triplet sample 802, e.g., as follows:

$$h_i^S = Avg(f_S(S_i)), \qquad (3)$$

where text encoder $f_S(\cdot)$ generates a set of representations for a set of text descriptions, $S_i$, respectively. Average pooling may be conducted over the set of outputs as the text-domain representation of object i.

As shown in the example of FIG. 8, cross-modal contrastive learning is performed to align the image, text, and point cloud representations. As shown in FIG. 8, for a 3D object i, representations/features 820 ($h_i^I$), 822 ($h_i^S$) and 818 ($h_i^P$) are extracted from image encoder 814, text encoder 816 and 3D cloud encoder 810. An example contrastive loss among each pair of modalities may be computed as follows:

$$L_{(M1,M2)} = \sum_{(i,j)\in\{+\}} -\frac{1}{2}\log\frac{\exp(h_i^{M_1} h_j^{M_2})}{\sum_k \exp(h_i^{M_1} h_k^{M_2})} - \frac{1}{2}\log\frac{\exp(h_i^{M_1} h_j^{M_2})}{\sum_k \exp(h_k^{M_1} h_j^{M_2})} \quad (4)$$

where $M_1$ and $M_2$ represent two modalities and (i, j) indicates a positive pair in each training batch.

Then the cross-modal contrastive learning uses back-propagation to update the parameters of the neural network based 3D encoder 810 and minimize $L_{final}$, which minimizes $L_{(M_1, M_2)}$ for all modality pairs with different coefficients as follows:

$$L_{final} = \alpha L_{(I,S)} + \beta L_{(I,P)} + \theta L_{(P,S)} \quad (5)$$

In some embodiments, during the cross-modal training process, when parameters of the image and text encoders are not frozen and updated, catastrophic forgetting may emerge if the training dataset has a limited data size. This may lead to significant performance drop when applying ULIP-2 in downstream tasks. As such, in some embodiments, the weights of $f_S(\cdot)$ and $f_I(\cdot)$ are frozen during the entire cross-modal training process, and only $f_P(\cdot)$ is updated with $L_{final}$. In those embodiments where parameters of the image and text encoders are frozen, in equation (5), $\alpha$ is set to 0.

In some embodiments, ULIP-2 aligns the triplet of 3D point clouds, 2D rendered images, and comprehensive descriptions to a unified feature space by adopting a powerful pre-trained vision language model SLIP to implement the pre-trained language-visual model 812, and freeze it during the pre-training. The feature space, already pre-aligned by SLIP, serves as the target space for integrating the 3D modality.

For example, during tri-modal pre-training, given a 3D object O, we extract its 3D point cloud P, randomly sample its 2D rendered image I~render(O), and generate its language description T~blip2(I), where render is the 3D-to-2D rendering operation and blip2 is to query BLIP-2 for image description. The image feature $f^I = E_I(I)$ and text feature $f^T = E_T(T)$ are extracted based on the pre-aligned and fixed image encoder $E_I$ and text encoder $E_T$ in SLIP. A 3D point cloud encoder $E_P$ is trained such that its 3D feature $f^P = E_P(P)$ is aligned with its image and text features. In these examples, the 3D-to-image alignment may use the contrastive loss similar in spirit to CLIP:

$$\mathcal{L}_{P2I} = \frac{1}{2}\sum_i \log\frac{\exp(f_i^P f_i^I/\tau)}{\sum_j \exp(f_i^P f_j^I/\tau)} + \log\frac{\exp(f_i^P f_i^I/\tau)}{\sum_j \exp(f_j^P f_i^I/\tau)} \quad (6)$$

where i, j are the sampling indices, and τ is a learnable temperature parameter. The first term indicates that the dot product of the 3D feature and the image feature of the same sample should stand out among other products where the image features are from different samples. Likewise, the second term indicates that the dot product of the 3D feature and the image feature of the same sample should stand out among other products where the 3D features are from different samples.

Similarly, the 3D-to-text alignment loss may be formulated as:

$$\mathcal{L}_{P2T} = \frac{1}{2}\sum_i \log\frac{\exp(f_i^P f_i^T/\tau)}{\sum_j \exp(f_i^P f_j^T/\tau)} + \log\frac{\exp(f_i^P f_i^T/\tau)}{\sum_j \exp(f_j^P f_i^T/\tau)} \quad (7)$$

The final training objective is to train the 3D encoder Ep that minimizes the sum of the two contrastive alignment losses above:

$$\min_{E_P} \mathcal{L}_{P2I} + \mathcal{L}_{P2T} \quad (8)$$

As such, by applying the contrastive losses, the 3D features of an object are aligned to its image features and text features during the training process.

Figure 9:
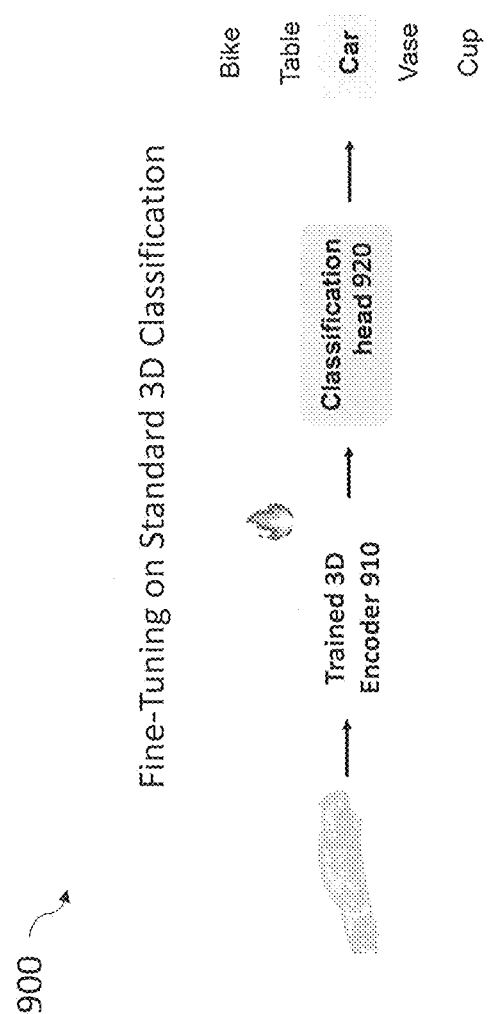
FIG. 9 is a simplified block diagram illustrating an example 3D visual understanding system where a trained 3D encoder is further finetuned on standard 3D classification to perform downstream 3D classification tasks, according to one embodiment described herein.

Referring to FIG. 9, in some embodiments, the well-trained 3D encoders, e.g., the neural network based 3D encoder 810 after cross-modal training described in FIGS. 7 and 8, are further fine-tuned in downstream tasks including standard 3D classification for performing downstream tasks. Specifically, in the example of FIG. 9, a 3D classification system 900 includes a trained 3D encoder 910 (e.g., trained by the cross-modal training of FIGS. 7 and 8) coupled to a classification head 920. The trained 3D encoder 910 is further fine-tuned, together with the classification head 920, for a particular downstream 3D classification task. After the fine tuning, the 3D classification system 900 (including the fine-tuned 3D encoder 910 and classification head 920) may be used to perform a 3D classification task.

Figure 10:
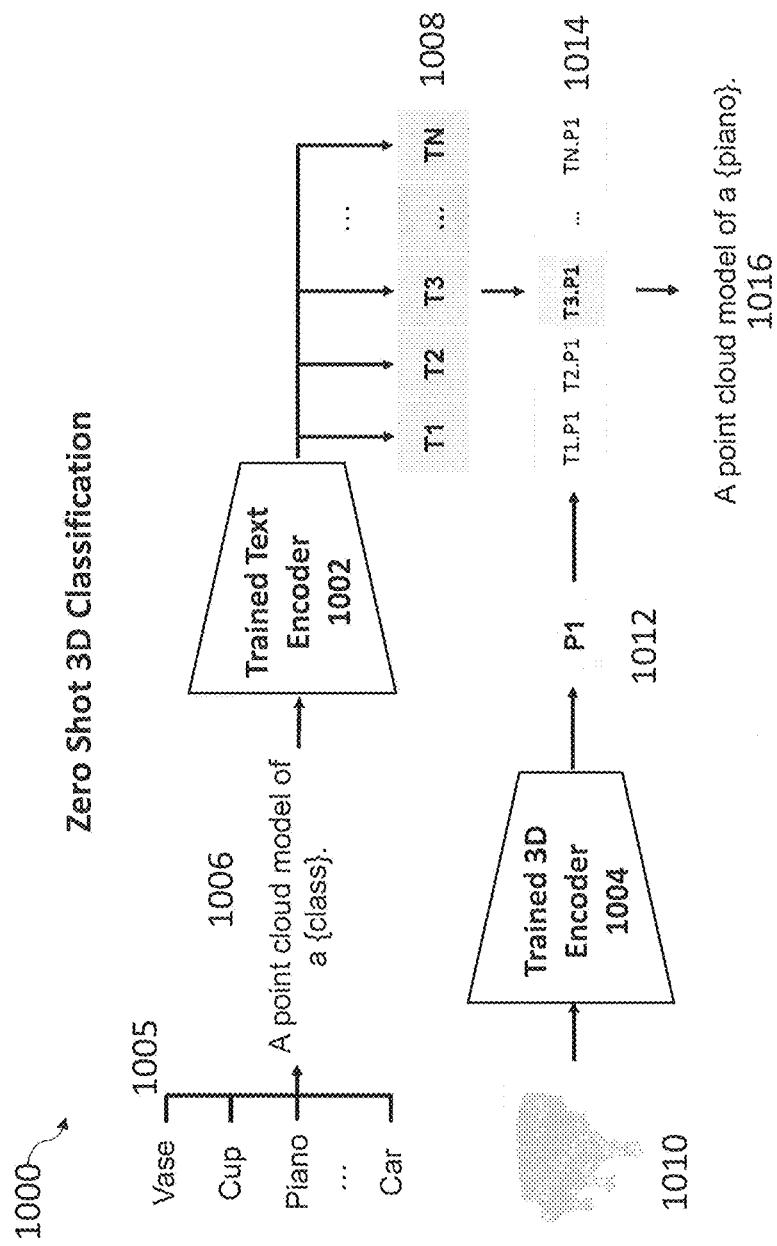
FIG. 10 is a simplified block diagram illustrating an example 3D visual understanding system using trained 3D encoders to perform zero shot 3D classification tasks, according to one embodiment described herein.

Referring to FIG. 10, in some embodiments, the well-trained 3D encoders, e.g., the neural network based 3D encoder 810 after cross-modal training of FIGS. 7 and 8, are used to perform zero shot 3D classification, without further tuning of the neural network based 3D encoders. As shown in the example FIG. 10, a 3D classification system 10000 includes a pre-trained text encoder 1002 and a pre-trained 3D encoder 1004 (e.g., trained by the cross-modal training of FIG. 8 with pre-trained text encoder 1002), where the pre-trained 3D encoder 1004 is aligned with the pre-trained text encoder 1002. Possible text descriptions 1006 are generated based on category candidates 1005 (e.g., "Vase," "Cup," "Piano," . . . "Car"). The possible text descriptions 1006 are sent to the trained text encoder 1002 to generate text representations 1008. A point cloud 1010 is send to the trained 3D encoder 1004 to generate 3D representations 1012, which is aligned with the corresponding text representations 1008. As such, at block 1014, the distances between each of the text representations 1008 of the category candidates and the 3D representations 1012 are determined. The category (e.g., "piano") that introduces the smallest distance is selected as the predicted category as shown in FIG. 10. The classification result 1016 (e.g., "A point cloud model of a {piano}) is determined based on the most aligned text representation having the smallest distance (e.g., T3) determined at block 1014. By using the aligned pre-trained text encoder 1002 and pre-trained 3D encoder 1004, zero-shot 3D classification is performed.

Example Data Experiments and Performance

Referring to FIGS. 11-16, ULIP-2 is quantitatively evaluated. Referring to FIG. 11, triplets creation based on two large-scale datasets of 3D objects, Objaverse and ShapeNet, is described. The different downstream tasks and the setup (including evaluation metrics, backbones, and pre-training details) are then discussed. Referring FIGS. 12-13, experiment results for zero-shot 3D classification tasks and standard 3D classification tasks are presented respectively and the benefits of ULIP-2 are discussed. Referring to FIGS. 14-16, ablation study is discussed.

Triplets Creation. The triplets each include a 3D point cloud, an images, and a language description. In the experiments, the triplets are created based on two large-scale datasets of 3D objects, Objaverse and ShapeNet. The triplets created from the corresponding datasets are referred to as ULIP-Objaverse Triplets and ULIP-ShapeNet Triplets respectively.

ULIP-Objaverse Triplets. Objaverse is a recently released and largest-scale realistic 3D dataset. It has approximately 800K real-world 3D objects, each of which is associated with metadata containing a "name" field. For each 3D object, 3D visualization software tools, e.g., Blender, are used to render 12 images, from viewpoints spaced equally by 360/12 degrees on a 360-degree circle around the center of the 3D object. For each rendered image, BLIP-opt6.7B in BLIP-2 is used to generate M (e.g., 10) detailed image descriptions, which are then ranked using CLIP-VIT-Large image-text similarity score. Based on an ablation study (discussed in detail below), an ensemble of the top k (e.g., k=1, 2, 3, 4, or 5) description(s) is chosen as the language modality input. 8 k and 2 k points are extracted from each 3D object to accommodate different downstream tasks. These well-paired triplets of comprehensive descriptions, 2D rendering images, and 3D point clouds are referred to as ULIP-Objaverse Triplets.

ULIP-ShapeNet Triplets. ULIP-Objaverse Triplets are generated using ShapeNet, a renowned synthetic dataset. Its publicly available subset has around 52.5K 3D objects with 55 annotated categories. For each object in this publicly available subset, 30 view angles are determined, e.g., as equally spaced on a 360-degree circle around the center of the 3D object. For each view angle, an RGB image and a depth map are rendered. The image description is generated using the same method as those for the ULIP-Objaverse Triplets.

Downstream Tasks. Experiments are conducted on two downstream tasks: (1) the zero-shot 3D classification task involving multimodal inputs and (2) the standard 3D classification task involving a single modality. Comparison of ULIP-2 with existing methods shows that ULIP-2 improves downstream task performances over existing methods by a significant margin. In addition to its remarkable performance, ULIP-2 also offers a significant advantage in that it does not require any human annotation during the pre-training process. This eliminates a substantial amount of manual labor typically associated with such tasks, further underscoring the scalability and efficiency of our approach.

ModelNet40 and ScanObjectNN datasets are used to benchmark ULIP-2. ModelNet40 is a synthetic CAD model dataset. It contains 9,843 training samples and 2.468 testing samples. ScanObjectNN is a real-world 3D dataset with 2,902 objects under 15 categories. The same dataset setup and preparation protocols used in ULIP are used, which ensure the consistency in our comparisons.

Setup. The details for the setup, including evaluation metrics, backbones, and pre-training details are described below.

For evaluation metrics, the same evaluation metrics used in ULIP are used. Specifically, the evaluation metrics include top-1 and top-5 accuracy for the zero-shot 3d classification task, and include overall accuracy and class average accuracy for the standard 3D classification task.

Regarding backbones, ULIP-2 is pretrained on two representative backbones: Point-BERT and PointNeX. Point-BERT is a transformer-based backbone that exhibits strong performance in ULIP's zero-shot classification experiments. PointNeXt is a recent work that proposes a lightweight backbone based on PointNet++ and delivers promising results on the ScanObjectNN benchmark.

Specifically, for the pre-training process, ULIP-2 is pre-trained on 8 Nvidia A100 GPUs (40G) with a batch size of 64 and a learning rate of 1e-3. ULIP-2 is pre-trained for 50 epochs on Objaverse and 250 epochs on ShapeNet, taking 1.5 days and 12 hours respectively. The final checkpoints are used for downstream tasks.

Experimental Results. The experimental results for zero-shot 3D classification tasks and standard 3D classification tasks are described below.

For zero-shot 3D classification tasks, the zero-shot 3D classification results on ModelNet40 are illustrated in FIG. 12. It is observed that, benefited from pre-training using ULIP-2, both PointNeXt and Point-BERT obtain significantly better results than the PointCLIP. Moreover, ULIP-2 has a significant improvement margin over ULIP on both datasets generated using ShapeNet and Objaverse. Specifically, on ShapeNet, ULIP-2 improves top-1 accuracy over ULIP by 8.3% and 6.0% individually with PointNeXt and Point-BERT respectively. On Objaverse, the improvements are on a similar scale. This validates the effectiveness of ULIP-2, which uses holistic-view language descriptions to boost the representation capability during pre-training. Especially, in ULIP-2, unique captions per 2D view enrich the language descriptions of a 3D object, in return enhancing the language-3D alignment.

For standard 3D classification tasks, the ULIP and community protocols for standard 3D classification are used. As shown in FIG. 13, 3D classification results on ScanObjectNN hardest set are illustrated. It is observed that ULIP-2 (using the Point-BERT backbone) improves the baseline method (no multimodal pre-training) by 3.6% on ShapeNet and by 5.9% on Objaverse. By using the PointNeXt backbone, ULIP-2 obtains 91.5% overall accuracy and sets up a new record on the ScanObjectNN benchmark. As such, the experiment results confirm the generalizable benefits of holistic-view language descriptions regardless of pre-training datasets or encoder backbones.

Referring to FIGS. 14, 15, and 16, ablation study is discussed below.

Different Vision-Language Models: Referring to FIG. 14, considering the language description quality from large multimodal models plays an important role in 3D representation pre-training, we conduct an ablation study over two such models. BLIP-2 is used throughout the benchmarking experiments above. It is compared to its earlier version BLIP for the zero-shot 3D classification task using ShapeNet pre-training dataset and Point-BERT backbone. Results in Table of FIG. 14 show that using BLIP-2 generated descriptions achieves slightly better results, thanks to its evolved vision-language alignment capability, suggesting that as the large multimodal models advance, the performance of ULIP-2 can be expected to improve correspondingly.

Number of 2D Views Per 3D Object: Referring to FIG. 15, an ablation study is performed for zero-shot 3D classification w.r.t. the number of 2D views per 3D object in pre-training. Results in Table of FIG. 15 demonstrate that, with the increase of the number of views, zero-shot classification accuracy increases accordingly. This validates that diverse language descriptions of holistic views, as provided in ULIP-2, benefit multimodal 3D representation learning.

Top-k Captions Per 2D View: Referring to FIG. 16, the pre-training sensitivity with regard to the number of captions per view being used is investigated. An ablation study is performed on Point-BERT with ULIP-2 pre-trained on ShapeNet for zero-shot 3D classification. Results in Table 6 show the insensitivity regardless of the number of top-k captions w (in total 10 captions). As a result, without losing generality, top-5 descriptions per 2D rendering are used throughout the experiments.

As shown by the experiment results, by using the ULIP-2 framework, a pre-training framework that generate well-aligned, holistic multimodal data for 3D understanding, and aligns multiple modalities of image, text, and point cloud in the same feature space using the multimodal data, representations of 3D backbone encoders are effectively improved. Methods using ULIP-2 achieve the state-of-the-art performance in both zero shot and standard 3D classification tasks. ULIP-2 utilizes large multimodal models to generate comprehensive language descriptions of 3D objects, which helps to overcome the limitations of existing 3D object datasets with regard to language descriptions' quality and scalability. Combined with an efficient multimodal pre-training framework and pre-train on the triplets of point clouds, images, and language from two large-scale 3D datasets, it is demonstrated that substantial and consistent improvements in zero-shot and standard 3D object classification over previous methods. Furthermore, ULIP-2 framework achieves a new state-of-the-art performance on the ScanObjectNN challenge leaderboard with a minimal number of parameters. ULIP-2 provides 3D multimodal pre-training without leveraging any human annotation effort. It has positive impacts such as reducing human labor.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a neural network based three-dimensional (3D) encoder, the method comprising:
   generating a first plurality of samples of a training dataset using a first 3D model of a 3D model dataset, wherein the generating the first plurality of samples includes:
      generating, using an image generator with multi-view rendering, a plurality of two-dimensional (2D) images having different viewpoints of the first 3D model;
      generating, using a first language model, a plurality of texts corresponding to the plurality of 2D images respectively, wherein the generating the plurality of texts includes:
         generating a first number of text descriptions for a first image of the plurality of 2D images;
         generating a first text based on one or more text descriptions selected from the first number of text descriptions;
      generating, a point cloud by randomly sampling points in the first 3D model; and
      generating the first plurality of samples using the plurality of 2D images, the plurality of texts, and the point cloud,
         wherein a first sample includes the first image, the first text corresponding to the first image, and the point cloud; and
   training the neural network based 3D encoder using the training dataset including the first plurality of samples.

2. The method of claim 1, wherein the first number of text descriptions are generated automatically without using metadata or a human language annotation associated with the first 3D model.

3. The method of claim 1, wherein the generating the plurality of texts includes:
   generating a third number of text descriptions using metadata or a human language annotation associated with the first 3D model; and
   generating a second text based on the first number of text descriptions and the third number of text descriptions;
   wherein a second sample includes the first image, the second text, and the point cloud.

4. The method of claim 1, wherein viewpoints of the plurality of 2D images of the first 3D model are spaced equally around a center of a 3D object of the first 3D model.

5. The method of claim 1, wherein the first language model includes a first generative model trained via multimodal learning.

6. The method of claim 1, wherein the neural network based 3D encoder is trained using a loss objective, and
   wherein the loss objective includes a 3D-to-image alignment contrastive loss and a 3D-to-text alignment contrastive loss.

7. The method of claim 1, wherein the training the neural network based 3D encoder using the training dataset including the first plurality of samples includes:
   generating image representations using the first image of a first sample of the first plurality of samples;
   generating text representations using the first text of the first sample;
   wherein the image representations and the text representations are generated using a pretrained vision and language model;

generating image representations using the first image of a first sample of the first plurality of samples;

generating text representations using the first text of the first sample;

wherein the image representations and the text representations are generated using a pretrained vision and language model;

generating 3D representations using the point cloud of the first sample; and updating parameters of the neural network based 3D encoder using a loss objective to align the 3D representations with the image representations and the text representations.

8. A system for providing a trained neural network based three-dimensional (3D) encoder, the system comprising:

a memory that stores a neural network based 3D encoder and a plurality of processor-executable instructions;

a communication interface that receives a 3D model dataset including a plurality of 3D models; and one or more hardware processors that read and execute the plurality of processor-executable instructions from the memory to perform operations comprising:

generating a first plurality of samples of the training dataset using a first 3D model of a 3D model dataset, wherein the generating the first plurality of samples includes:

generating, using an image generator with multi-view rendering, a plurality of two-dimensional (2D) images having different viewpoints of the first 3D model;

generate, using a first language model, a plurality of texts corresponding to the plurality of 2D images respectively, wherein the generating the plurality of texts includes:

generating a first number of text descriptions for a first image of the plurality of 2D images;

generating a first text based on one or more text descriptions selected from the first number of text descriptions;

generating, a point cloud by randomly sampling points in the first 3D model; and generating the first plurality of samples using the plurality of 2D images, the plurality of texts, and the point cloud, wherein a first sample includes the first image, the first text corresponding to the first image, and the point cloud; and training the neural network based 3D encoder using the training dataset including the first plurality of samples.

9. The system of claim 8, wherein the first number of text descriptions are generated automatically without using metadata or a human language annotation associated with the first 3D model.

10. The system of claim 9, wherein the generating the plurality of texts includes:

generating a third number of text descriptions using metadata or a human language annotation associated with the first 3D model; and generating a second text based on the first number of text descriptions and the third number of text descriptions;

wherein a second sample includes the first image, the second text, and the point cloud.

11. The system of claim 8, wherein viewpoints of the plurality of 2D images include:

a first plurality of viewpoints spaced equally on a first 360-degree circle around a center of a 3D object of the first 3D model; and a second plurality of viewpoints spaced equally on a second 360-degree circle around the center of the 3D object.

12. The system of claim 8, wherein the first language model includes a first generative model trained via multi-modal learning.

13. The system of claim 8, wherein the neural network based 3D encoder is trained using a loss objective, and wherein the loss objective includes a 3D-to-image alignment contrastive loss and a 3D-to-text alignment contrastive loss.

14. The system of claim 8, wherein the training the neural network based 3D encoder using the training dataset including the first plurality of samples includes:

generating image representations using the first image of a first sample of the first plurality of samples;

generating text representations using the first text of the first sample;

wherein the image representations and the text representations are generated using a pretrained vision and language model;

generating 3D representations using the point cloud of the first sample; and updating parameters of the neural network based 3D encoder using a loss objective to align the 3D representations with the image representations and the text representations.

15. A non-transitory machine-readable medium comprising a plurality of machine-executable instructions which, when executed by one or more processors, are adapted to cause the one or more processors to perform operations comprising:

receiving, via a data interface, a 3D model dataset including a plurality of 3D models;

generating a first plurality of samples of the training dataset using a first 3D model of the 3D model dataset, wherein the generating the first plurality of samples includes:

generating, using an image generator with multi-view rendering, a plurality of two-dimensional (2D) images having different viewpoints of the first 3D model;

generate, using a first language model, a plurality of texts corresponding to the plurality of 2D images respectively, wherein the generating the plurality of texts includes:

generating a first number of text descriptions for a first image of the plurality of 2D images;

generating a first text based on one or more text descriptions selected from the first number of text descriptions;

generating, a point cloud by randomly sampling points in the first 3D model; and generating the first plurality of samples using the plurality of 2D images, the plurality of texts, and the point cloud, wherein a first sample includes the first image, the first text corresponding to the first image, and the point cloud; and training a neural network based 3D encoder using the training dataset including the first plurality of samples.

16. The non-transitory machine-readable medium of claim 15, wherein the first number of text descriptions are generated automatically without using metadata or a human language annotation associated with the first 3D model.

17. The non-transitory machine-readable medium of claim 16, wherein the generating the plurality of texts includes:
   generating a third number of text descriptions using metadata or a human language annotation associated with the first 3D model; and
   generating a second text based on the first number of text descriptions and the third number of text descriptions;
   wherein a second sample includes the first image, the second text, and the point cloud.

18. The non-transitory machine-readable medium of claim 15, wherein viewpoints of the plurality of 2D images include:
   a first plurality of viewpoints spaced equally on a first 360-degree circle around the center of a center of a 3D object of the first 3D model; and
   a second plurality of viewpoints spaced equally on a second 360-degree circle around the center of the 3D object.

19. The non-transitory machine-readable medium of claim 15, wherein the first language model includes a first generative model trained via multimodal learning.

20. The non-transitory machine-readable medium of claim 19, wherein the training the neural network based 3D encoder using the training dataset including the first plurality of samples includes:
   generating image representations using the first image of a first sample of the first plurality of samples;
   generating text representations using the first text of the first sample;
   wherein the image representations and the text representations are generated using a pretrained vision and language model;
   generating 3D representations using the point cloud of the first sample; and
   updating parameters of the neural network based 3D encoder using a loss objective to align the 3D representations with the image representations and the text representations.

* * * * *